US012455965B2

(12) United States Patent
Gray et al.

(10) Patent No.: US 12,455,965 B2
(45) Date of Patent: Oct. 28, 2025

(54) MALWARE SCANS

(71) Applicant: Hewlett-Packard Development Company, L.P., Spring, TX (US)

(72) Inventors: Tobias Edward Sebastian Gray, Cambridge (GB); Ratnesh Kumar Pandey, Cambridge (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 177 days.

(21) Appl. No.: 18/261,324

(22) PCT Filed: Feb. 8, 2021

(86) PCT No.: PCT/US2021/016994
§ 371 (c)(1),
(2) Date: Jul. 13, 2023

(87) PCT Pub. No.: WO2022/169461
PCT Pub. Date: Aug. 11, 2022

(65) Prior Publication Data
US 2024/0070276 A1    Feb. 29, 2024

(51) Int. Cl.
*G06F 21/00* (2013.01)
*G06F 21/56* (2013.01)
*G06F 21/57* (2013.01)

(52) U.S. Cl.
CPC .......... *G06F 21/566* (2013.01); *G06F 21/564* (2013.01); *G06F 21/577* (2013.01)

(58) Field of Classification Search
CPC ..... G06F 21/577; G06F 21/564; G06F 21/566

USPC .......................................................... 726/24
See application file for complete search history.

(56) References Cited

U.S. PATENT DOCUMENTS

| 6,851,058 | B1* | 2/2005 | Gartside ................. G06F 21/56 726/24 |
| 7,861,296 | B2 | 12/2010 | Costea et al. |
| 8,392,379 | B2 | 3/2013 | Lee |
| 8,516,597 | B1* | 8/2013 | Sharma ................. G06F 21/577 709/224 |
| 9,141,794 | B1 | 9/2015 | Soubramanien et al. |
| 9,245,120 | B2 | 1/2016 | Friedrichs et al. |
| 10,791,138 | B1 | 9/2020 | Siddiqui et al. |
| 12,001,543 | B2* | 6/2024 | Revivo ................. G06F 21/564 |
| 2008/0301796 | A1* | 12/2008 | Holostov ............. H04L 63/105 726/12 |

(Continued)

FOREIGN PATENT DOCUMENTS

CN    109313687 A    2/2019
CN    109791586 A    5/2019

(Continued)

*Primary Examiner* — Josnel Jeudy
(74) *Attorney, Agent, or Firm* — Quarles & Brady LLP

(57) ABSTRACT

An example non-transitory computer readable storage medium comprises instructions that when executed cause a processor of an electronic device to: in response to detecting a malware scan trigger associated with a file, determine a combined risk score associated with the file based on metadata of the file and a source of the malware scan trigger, where the source includes a file access interceptor, a file write observer, and a file indexer; determine a scan priority based on the combined risk score; and perform a malware scan on the file based on the scan priority.

17 Claims, 5 Drawing Sheets

(56) References Cited

U.S. PATENT DOCUMENTS

| | | |
|---|---|---|
| 2011/0219451 A1 | 9/2011 | Mcdougal et al. |
| 2016/0308944 A1 | 10/2016 | Zhang et al. |
| 2017/0061123 A1 | 3/2017 | Parker-Wood et al. |
| 2017/0063888 A1 | 3/2017 | Muddu et al. |
| 2018/0048657 A1 | 2/2018 | Hittel et al. |
| 2019/0132273 A1 | 5/2019 | Ryan et al. |
| 2021/0084063 A1* | 3/2021 | Triantafillos .......... H04L 67/535 |
| 2025/0111046 A1* | 4/2025 | Pascual ................ G06F 21/554 |

FOREIGN PATENT DOCUMENTS

| | | |
|---|---|---|
| CN | 111373376 A | 7/2020 |
| WO | 2017/127850 A1 | 7/2017 |
| WO | 2017/216774 A1 | 12/2017 |

* cited by examiner

MALWARE SCANS

BACKGROUND

Computer executable instructions that are specifically designed to cause damage to a computing device or steal data information from a computing device are referred to as malware or virus.

BRIEF DESCRIPTION OF THE DRAWINGS

Some examples of the present application are described with respect to the following figures.

DETAILED DESCRIPTION

Antivirus application may be installed on a computing device to detect and protect against malware. An antivirus application may include a malware scanner to perform malware scans. To scan a file thoroughly for malware may take a significant amount of time, which can be detrimental to user experience. Examples described herein provide an approach to enable a computing device to perform a malware scan on a file based on a scan priority. The scan priority may determine a scan depth and a number of scans that is suitable for the file. Thus, the impact on user experience due to malware scans may be reduced.

In an example, a non-transitory computer readable storage medium may include instructions that when executed cause a processor of an electronic device to: in response to detecting a malware scan trigger associated with a file, determine a combined risk score associated with the file based on metadata of the file and a source of the malware scan trigger, where the source includes a file access interceptor, a file write observer, and a file indexer; determine a scan priority based on the combined risk score; and perform a malware scan on the file based on the scan priority.

In another example, a non-transitory computer readable storage medium may include instructions that when executed cause a processor of an electronic device to: in response to detecting a malware scan trigger associated with a file, determine a scan priority associated with the file based on metadata of the file; determine a scan depth and a number of scans based on the scan priority; and perform a set of malware scans on the file based on the scan depth and the number of scans.

In another example, a non-transitory computer readable storage medium may include instructions that when executed cause a processor of an electronic device to: in response to detecting a malware scan trigger associated with a file, determine a scan priority associated with the file based on metadata of the file; determine user activity information, wherein the user activity information indicates if a user actively interacting with the electronic device; and determine if a malware scan of the file is to be delayed based on the scan priority and the user activity information.

Figure 1:
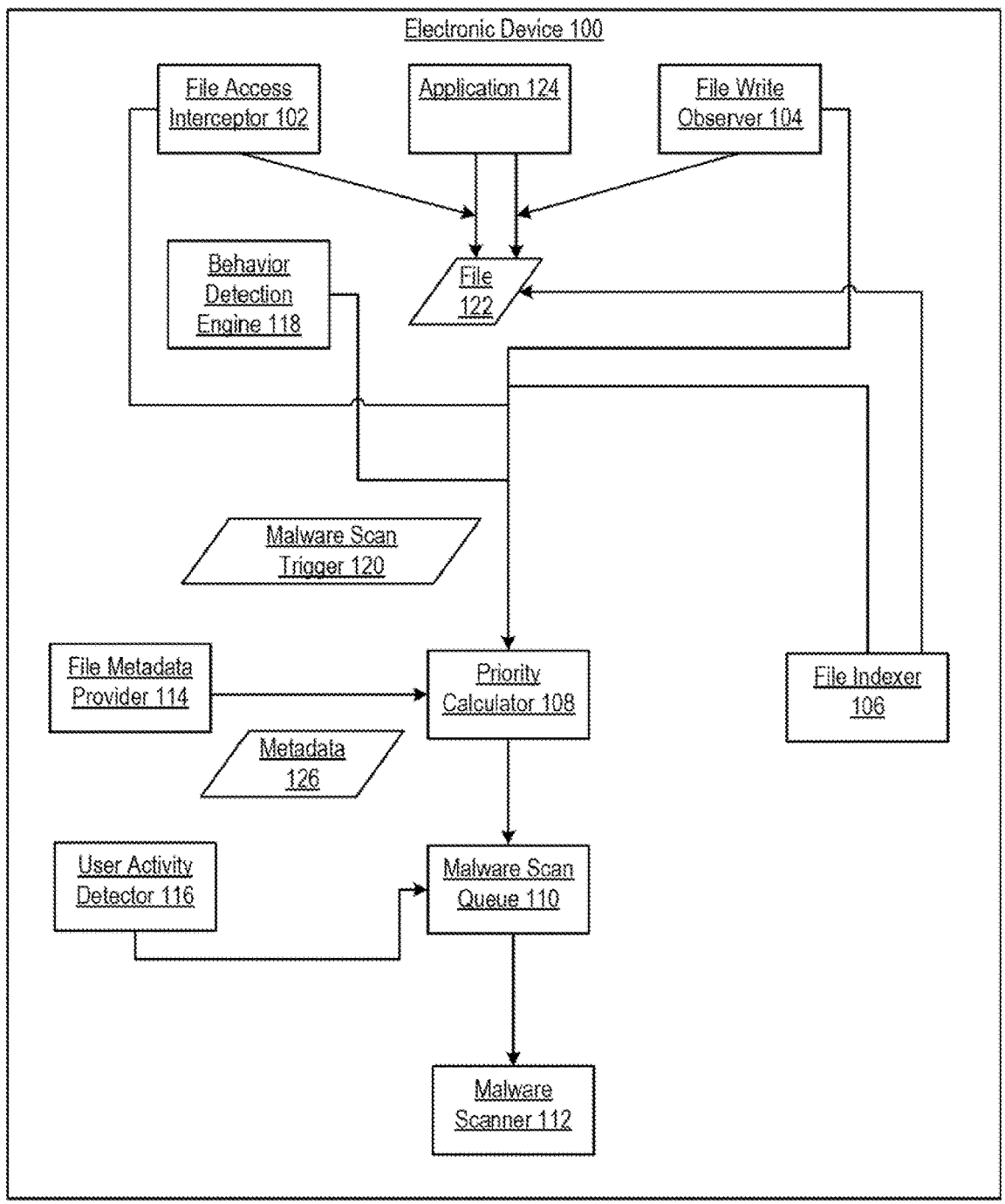
FIG. 1 illustrates a functional block of an electronic device to scan for malware based on a scan priority of a file, according to an example.

Turning to FIG. 1, FIG. 1 illustrates a functional block of an electronic device 100 to scan for malware based on a scan priority of a file, according to an example. Electronic device 100 may be, for example, a laptop computer, a desktop computer, an all-in-one system, a tablet computing device, a mobile phone, an electronic book reader, a wearable computing device (e.g., a smart watch), or any other electronic device suitable to perform malware scan on a file.

Electronic device 100 may include a file access interceptor 102, a file write observer 104, a file indexer 106, a priority calculator 108, a malware scan queue 110, a file metadata provider 114, a user activity detector 116, and a behavioral detection engine 118. File access interceptor 102, file write observer 104, file indexer 106, priority calculator 108, malware scan queue 110, file metadata provider 114, user activity detector 116, and behavioral detection engine 118 may each be implemented using processor executable instructions, hardware devices (e.g., semiconductor-based microprocessors, integrated circuits, field-programmable gate arrays, application-specific integrated circuits, chipsets), or a combination thereof.

Malware Scan Trigger Generation

During operation, priority calculator 108 may detect a malware scan trigger 120 associated with a file 122. Malware scan trigger 120 may be generated when an attempt to access file 122 or an attempt to add file 122 to electronic device 100 is detected. In some examples, file 122 may be stored in a memory (not shown in FIG. 1) of electronic device 100. An application 124 executing in electronic device 100 may access file 122. When application 124 attempts to read file 122, file access interceptor 102 may intercept a read command associated with file 122 from application 124. In response to detecting the read command, file access interceptor 102 may generate malware scan trigger 120 and transmit malware scan trigger 120 to priority calculator 108. When application 124 attempts to write to file 122, file write observer 104 may intercept a write command associated with file 122 from application 124. In response to detecting the write command, file write observer 104 may generate malware scan trigger 120 and transmit malware scan trigger 120 to priority calculator 108.

In some examples, file 122 may be stored in an external storage device (not shown in FIG. 1), such as a flash memory storage device. When the external storage device is connected to electronic device 100, file indexer may index file 122 for electronic device 100. In response to attempting to index file 122, file indexer may generate malware scan trigger 120 and transmit malware scan trigger to priority calculator 108.

Scan Priority Determination

In response to detecting malware scan trigger 120, priority calculator 108 may determine a scan priority associated with file 122. Priority calculator 108 may compute a combined risk score to determine the scan priority. The combined risk score may be a numerical value that is determined based on a set of risk scores. In some examples, priority calculator 108 may determine the combined risk score based on an access risk score, a base risk score, a metadata risk score, a scan age risk score, or a combination thereof.

Access Risk Score

The access risk score may be determined based on a risk profile of an entity that attempts to access file 122. For example, behavioral detection engine 118 may generate a risk profile for application 124. The risk profile may indicate if application 124 is normal, suspicious, or malicious application. "Normal" may indicate that application 124 has a low likelihood of being a piece of malware application. "Suspicious" may indicate that application 124 has a medium likelihood (e.g., 50%) of being a piece of malware application. "Malicious" may indicate that application 124 has a high likelihood of being a piece of malware application. Behavioral detection engine 118 may generate a similar risk profile for an external storage device if file 122 is introduced to electronic device 100 via the external storage device.

When the risk profile is normal, priority calculator 108 may assign a first value to the access risk score. When the risk profile is suspicious, priority calculator 108 may assign a second value to the access risk score that is higher than the first value. When the risk profile is malicious, priority calculator 108 may assign third value to the access risk score that is higher than the second value.

Base Risk Score

The base risk score may be determined based on the source of malware scan trigger 120. In some examples, the source of malware scan trigger 120 may be the entity that generates malware scan trigger 120, such as file access interceptor 102, file write observer 104, and file indexer 106. When the source is file access interceptor 102, the base risk score may have a first value as assigned by priority calculator 108. When the source is file write observer 104, the base risk score may have a second value that is higher than the first value. When the source is file indexer 106, the base risk score may have a third value that is higher than the second value. The base risk score of each source may be arranged to reflect the potential risk of malware exposure associated with each source.

Metadata Risk Score

The metadata risk score may be determined based on metadata 126 associated with file 122. Metadata 126 may include any information related file 122 besides content of file 122. Priority calculator 108 may receive metadata 126 from metadata provider 114. In some examples, metadata 126 may include a first type of metadata corresponding to acquisition information of file 122. The acquisition information may describe where file 122 is acquired from, how file 122 is acquired, or a combination thereof.

In some examples, the acquisition information may describe a webpage that file 122 was downloaded from. The acquisition information may also describe how a user navigated to the webpage to download file 122 (e.g., whether the user searched from file 122 on a search engine or the user clicked on a link in an email to get file 122). Thus, priority calculator 108 may determine a value of metadata risk score based on how risky the webpage is and how risky the manner in which the user downloaded file 122. If the webpage is high risk (e.g., an Internet forum or a social network site) and the user downloaded file 122 from a link in the webpage, metadata risk score may have a first value. If the webpage is low risk (e.g., hosted on company intranet) and the user specifically searched for file 122, metadata risk score may have a second value different from the first value. In some examples, the second value may be lower than the first value. In some examples, the second value may be higher than the first value.

In some examples, file 122 may be received as an email attachment. Thus, the acquisition information may describe the source of the email. Priority calculator 108 may determine a value of the metadata risk score based on the acquisition information. For example, priority calculator 108 may assign a first value to the metadata risk score if the email came from a first-time sender (i.e., high risk). Priority calculator 108 may assign a second value to the metadata risk score if the email came from a trusted source (i.e., low risk). Further, priority calculator 108 may further determine the value of the metadata risk score using routing information of the email, such as if the email passed the Domain Keys Identified Mail (DKIM) check (i.e., low risk if the email pass the DKIM check, high risk if the email did not pass the DKIM check).

In some examples, file 122 may be created by an application stored in electronic device 100. Thus, the acquisition information may include the type and/or identity of the application. Priority calculator 108 may determine the value of the metadata risk score using the acquisition information. For example, priority calculator 108 may assign a first value to the metadata risk score if the application is a file sharing application (i.e., high risk). Priority calculator 108 may assign a second value to the metadata risk score if the application is a desktop publishing application (i.e., low risk).

In some examples, metadata 126 may also include a second type of metadata corresponding to a security parameter of file 122. The security parameter may be digital signature information embedded in file 122. Priority calculator 108 may determine the value of the metadata risk score using the digital signature information. For example, priority calculator 108 may assign a first value to the metadata risk score if file 122 is not signed with a digital signature or is signed with an invalid digital signature (i.e., high risk). Priority calculator 108 may assign a second value to the metadata risk score if file 122 is signed with a valid digital signature from a trusted source (i.e., low risk), such as an operating system provider. Thus, priority calculator 108 may determine the value of the metadata risk using the first type of metadata, the second type of metadata, or a combination thereof. Although one file metadata provider 114 is shown in FIG. 1, it should be understood that a plurality of file metadata providers may be used. Each distinct file metadata provider may provide a distinct type of metadata to priority calculator.

Scan Ade Risk Score

The scan age risk score may be determined based on a length of time and the number of malware definition updates since a previous scan of file 122 (i.e., the last time file 122 was scanned for malware). For example, if file 122 is not on a recent scan list (indicating that file 122 was not scan in the latest malware scan) and there has been a malware definition update since the last time file 122 was scanned for malware (i.e., high risk), priority calculator 108 may assign a first value to the scan age risk score. If file 122 is not on the recent scan list (indicating that file 122 was not scanned in the latest batch of files scanned for malware) and there has been an update to the malware definition since the last time file 122 was scanned for malware (i.e., high risk), priority calculator 108 may assign a first value to the scan age risk score. If file 122 is on the recent scan list and there has not been a malware definition update since the last time file 122 was scanned for malware (i.e., low risk), priority calculator 108 may assign a second value to the scan age risk score. In some examples, malware scanner 112 may provide the recent scan list, information on malware definition update, or a combination thereof to priority calculator 108. In some examples, an operating system of electronic device 100 (not shown in FIG. 1) may provide the recent scan list, information on malware definition update, or a combination thereof to priority calculator 108.

Combined Risk Score

Priority calculator 108 may determine a value of the combined risk score based on the access risk score, the base risk score, the metadata risk score, the scan age risk score, or a combination thereof. The values of the access risk score, the base risk score, the metadata risk score, and the scan age risk score may each be weighted to compute the value of the combined risk score. The weight of each of the scores may be different to reflect the level of risk the particular score represents. In some examples, the value of the combined risk score may be a sum of the weighted values of the access risk score, the base risk score, the metadata risk score, the scan age risk score, or the combination thereof. In some examples, the weights may also be adjustable. The weights may be adjustable manually by a user of electronic device 100, via a central management console, derived using machine learning based on historical data for previously known malicious files, etc.

Based on the value of the combined risk score, priority calculator 108 may determine a scan priority for file 122. For example, when the value of the combined risk score is within a first range (e.g., between 10 and 15), the scan priority may be a first scan priority. The first scan priority may represent high risk of malware exposure. For example, file 122 may have a high risk of malware exposure when file 122 has not been scanned yet and is being launched as a process. As another example, file 122 may have a high risk when file 122 is not scanned yet and is being loaded by another process for which section sync is created. As another example, file 122 may have a high risk when file 122 has been modified by a process that is flagged as suspicious or malicious.

When the value of the combined risk score is within a second range (e.g., between 5 and 9), the scan priority may be a second scan priority. The second scan priority may represent medium risk of malware exposure As an example, file 122 may have a medium risk of malware exposure when file 122 is newly written by a process in electronic device 100 and is not being accessed by any process so far.

When the value of the combined risk score is within a third range (e.g., between 1 and 4), the scan priority may be a third scan priority. The third scan priority may represent low risk of malware exposure As an example, file 122 may have a low risk of malware exposure when file 122 is a headerless file, such as a text file, a database file, or log file, that is frequently updated by an application.

Malware Scan Queue

Malware scan queue 110 may store a list of files for malware scans by malware scanner 112. The list may be sorted by scan priority. When a file is to be scanned by malware scanner 112, such as file 122, the file may be removed from malware scan queue 110 to be scanned by malware scanner 112.

In some examples, malware scan queue 110 may remove a file for scanning based on user activity information provided by user activity detector 116 and a scan priority of the file. As described in more detail below, the user activity information may indicate if a user is actively interacting with electronic device 100. When the scan priority is the first priority (i.e., high risk) or the second priority (i.e., medium risk), malware scan queue 110 may remove the file for scanning regardless of the content of the user activity information. When the scan priority is the third priority (i.e., low risk), malware scan queue 110 may remove the file for scanning only when the user activity information indicates that the user is not actively interacting with electronic device 100; malware scan queue 110 may delay a malware scan of the file by keeping the file in malware scan queue 110 until the user activity information indicates that the user is no longer actively interacting with electronic device 100.

Malware Scanner

Malware scanner 112 may perform a set of malware scans on a file based on a scan priority of the file. In some examples, priority calculator 108 may determine a scan depth and a number of scans based on the scan priority. A scan depth may indicate how many levels of embedded nested formats to scan for malware, how many malware detection rules to apply, how many forms of malicious behavior analysis to apply, other parameters associated with a malware scan, or a combination thereof.

When the scan priority is the first scan priority, priority calculator 108 may determine that the file, such as file 122, may be scanned immediately without delay by malware scanner 112 at a first scan depth. At the first scan depth, malware scanner 112 may use fewer detection rules (e.g., avoid scanning a word processing document with detection rules for malicious executable binary code) and may skip certain forms of analysis for malicious behavior (e.g., running executable code inside a sandbox environment in a virtual machine). Priority calculator 108 may also place the file in malware scan queue 110 for a second malware scan at a second scan depth at a subsequent time. Thus, malware scanner 112 may perform malware scan on the file twice, a first time at the first scan depth and a second time at the second scan depth, which is more thorough or in depth than the first scan depth.

When the scan priority is the second scan priority or the third scan priority, priority calculator 108 may place the file in malware scan queue 110 for scanning. Malware scanner 112 may perform malware scan on the file at the second scan depth. Thus, in some examples, when the scan priority is the second scan priority or the third scan priority, a single malware scan may be performed. In some examples, malware scanner 112 perform malware scan as a background task that has a lower input/output and/or processor priority than other user tasks executing on electronic device 100.

User Activity Detector

User activity detector 116 monitor aspects of electronic device 100 to determine if a user is actively interacting with electronic device 100. User activity detector 116 may generate user activity information and provide the user activity information to malware scan queue 110 to determine a timing of malware scan as described above. The user activity information may be any information that indicates if electronic device 100 is actively used by a user.

In some examples, the user activity information may include power source information of electronic device 100 that indicates whether electronic device 100 is powered by a battery or an alternate current (AC) adapter. Battery power is a finite resource and if a user has disconnected electronic device 100 from a power source (e.g., the AC adapter) then the user does not expect electronic device 100 to drain the battery power unnecessarily, therefore if electronic device 100 is on battery power then electronic device 100 may be considered to be actively used by the user. If electronic device 100 is connected to the AC adapter, then the power source information may be ignored as the power source information alone may not be sufficient to indicate if the electronic device 100 is actively used by the user.

In some examples, the user activity information may include a status of a security mechanism of electronic device 100. The security mechanism may include a lock screen, a physical device lock, or any other device or processor executable instructions that block access to electronic device 100 (e.g., by disabling input devices of electronic device 100) or reduce functionalities of electronic device 100 (e.g., by disabling an input/output port of electronic device 100) without an entry of a password, biometrics, or other authentication measures. If the status of the security mechanism is active, then electronic device 100 may be considered to not be actively used by the user. If the status of the security mechanism is inactive, then electronic device 100 may be considered to be actively used by the user.

In some examples, the user activity information may include a window size displaying content of a foreground application that is executing on electronic device 100. A foreground application may be an application that is designated by an operating system of electronic device 100 as active (e.g., after being selected by a user of electronic device 100). If the window size of the foreground application is maximized, then electronic device 100 may be considered to be actively used by the user. If the window size is not maximized, then electronic device 100 may be considered to not be actively used by the user.

In some examples, the user activity information may include a status of an input device of electronic device 100. The input device may be a keyboard, a touchscreen, a microphone, a touchpad, or any other device that is suitable to receive an input from a user. If the status of the input device is active, then electronic device 100 may be considered to be actively used by the user. If the status of the input device is inactive, then electronic device 100 may be considered to not be actively used by the user. An input device may be considered active if the input device has received an input within a time window (e.g., 1 minute). An input device may be considered inactive if the input device has not received an input within the time window.

Thus, the user activity information may include the power source information, the status of a security mechanism, the window size, the status of an input device, or a combination thereof.

Figure 2:
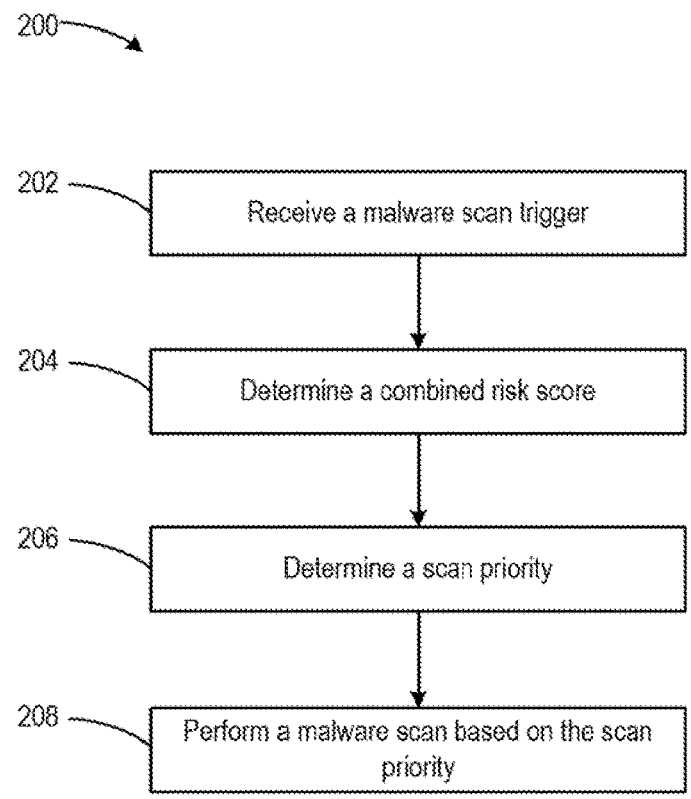
FIG. 2 illustrates a method of scanning for malware based on a scan priority of a file, according to an example.

FIG. 2 illustrates a method 200 of scanning for malware based on a scan priority of a file, according to an example. Method 200 may be implemented by electronic device 100 of FIG. 1.

Method 200 may include receiving a malware scan trigger, at step 202. For example, priority calculator 108 may receive malware scan trigger 120 from file access interceptor 102, Method 200 may also include determining a combined risk score, at step 204. For example, priority calculator 108 may determine a combined risk score based on the access risk score, the base risk score, the metadata risk score, the scan age risk score, or a combination thereof.

Method 200 may further include determining a scan priority, at step 206. For example, priority calculator 108 may determine the scan priority based on the combined risk score. Method 200 may further include performing a malware scan based on the scan priority, at step 208. For example, malware scanner 112 may perform a malware scan on file 122 based on the scan priority.

Figure 3:
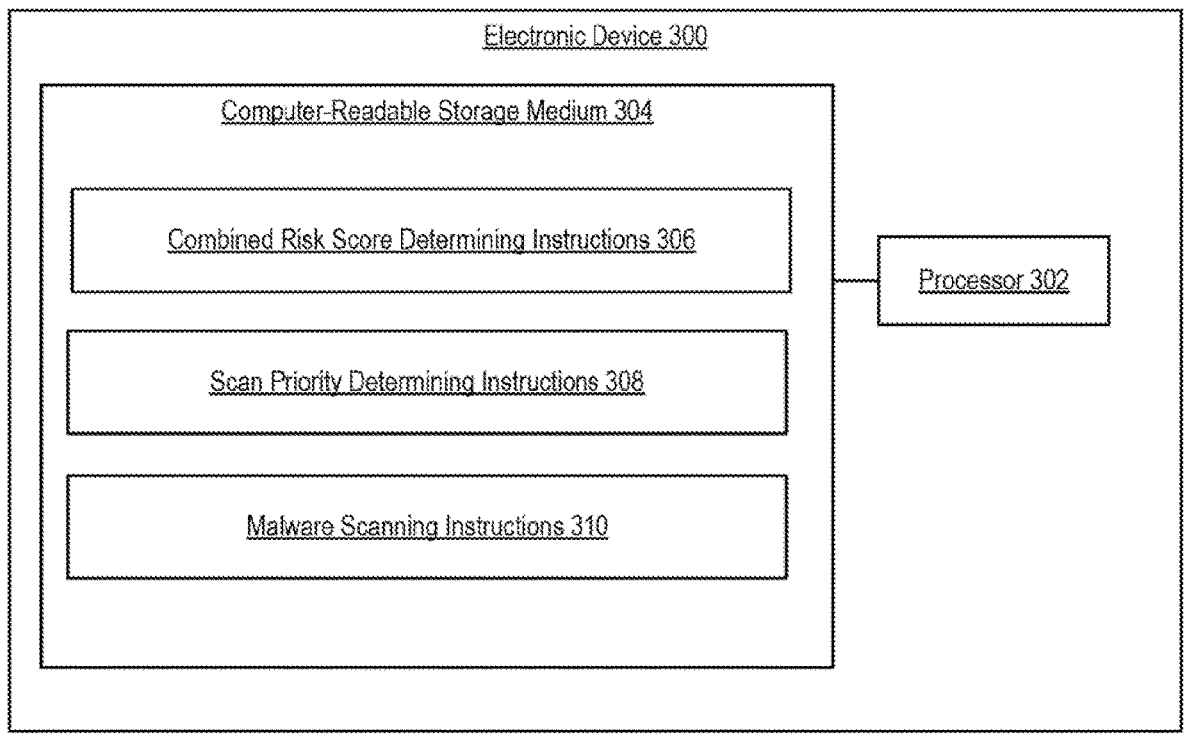
FIG. 3 illustrates an electronic device to scan for malware based on a scan priority of a file, according to another example.

FIG. 3 illustrates an electronic device 300 to scan for malware based on a scan priority of a file, according to another example. Electronic device 300 may implement electronic device 100 of FIG. 1. Electronic device 300 may include a processor 302 and a computer-readable storage medium 304.

Processor 302 may be a central processing unit (CPU), a semiconductor-based microprocessor, an integrated circuit (e.g., a field-programmable gate array, an application-specific integrated circuit), and/or other hardware devices suitable for retrieval and execution of instructions stored in a computer-readable storage medium. Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. Computer-readable storage medium 304 may be encoded with a series of processor executable instructions 306, 308, and 310.

Combined risk score determining instructions 306 may determine a combined risk score of a file. For example, referring to FIG. 1, priority calculator 108 may determine a value of the combined risk score based on the access risk score, the base risk score, the metadata risk score, the scan age risk score, or a combination thereof. Scan priority determining instructions 308 may determine a scan priority based on the combined risk score. For example, referring to FIG. 1, priority calculator 108 may determine a scan priority associated with file 122 based on a combined risk score. Malware scanning instructions 310 may perform a malware scan on the file based on the scan priority. For example, referring to FIG. 1, malware scanner 112 may perform a malware scan on file 122 based on the scan priority associated with file 122.

Figure 4:
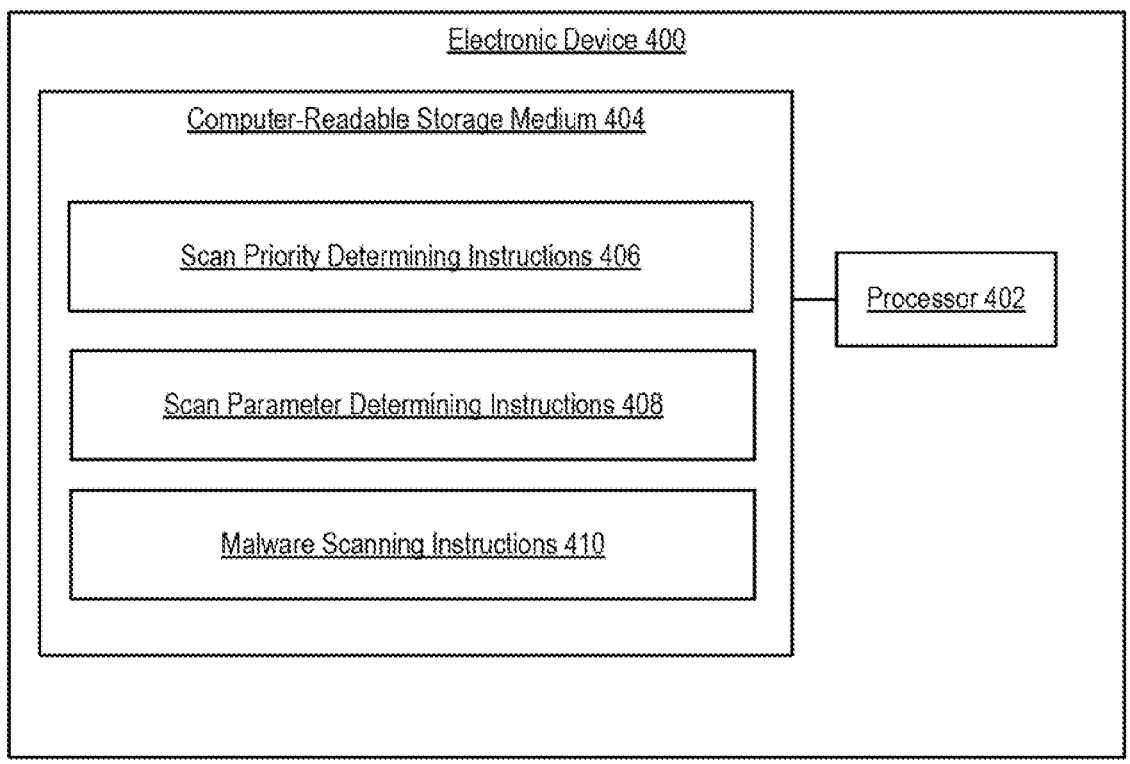
FIG. 4 illustrates an electronic device to scan for malware based on a scan priority of a file, according to another example.

FIG. 4 illustrates an electronic device 400 to scan for malware based on a scan priority of a file, according to another example. Electronic device 400 may implement electronic device 100 of FIG. 1. Electronic device 400 may include a processor 402 and a computer-readable storage medium 404. Processor 402 may be similar to processor 302 of FIG. 3. Computer-readable storage medium 404 may be similar to computer-readable storage medium 304 of FIG. 3. Computer-readable storage medium 404 may be encoded with instructions 406, 408, and 410.

Scan priority determining instructions 406 may determine a scan priority based on the combined risk score. For example, referring to FIG. 1, priority calculator 108 may determine a scan priority associated with file 122 based on a combined risk score. Scan parameter determining instructions 408 may determine a scan depth and a number of scans based on the scan priority. For example, referring to FIG. 1, when the scan priority is the first scan priority, priority calculator 108 may determine that the file, such as file 122, may be scanned immediately without delay by malware scanner 112 at a first scan depth. Priority calculator 108 may also place the file in malware scan queue 110 for a second malware scan at a second scan depth at a subsequent time. When the scan priority is the second scan priority or the third scan priority, priority calculator 108 may place the file in malware scan queue 110 for scanning. Malware scanning instructions 410 may perform a set of malware scans on a file based on the scan parameters. For example, referring to FIG. 1, when the scan priority is the first priority, the set of malware scans may include a plurality of malware scans: a first scan at a first scan depth and a second subsequent scan at a second scan depth. When the scan priority is the second or third priority, the set of malware scans may include just a single scan at the second scan depth.

Figure 5:
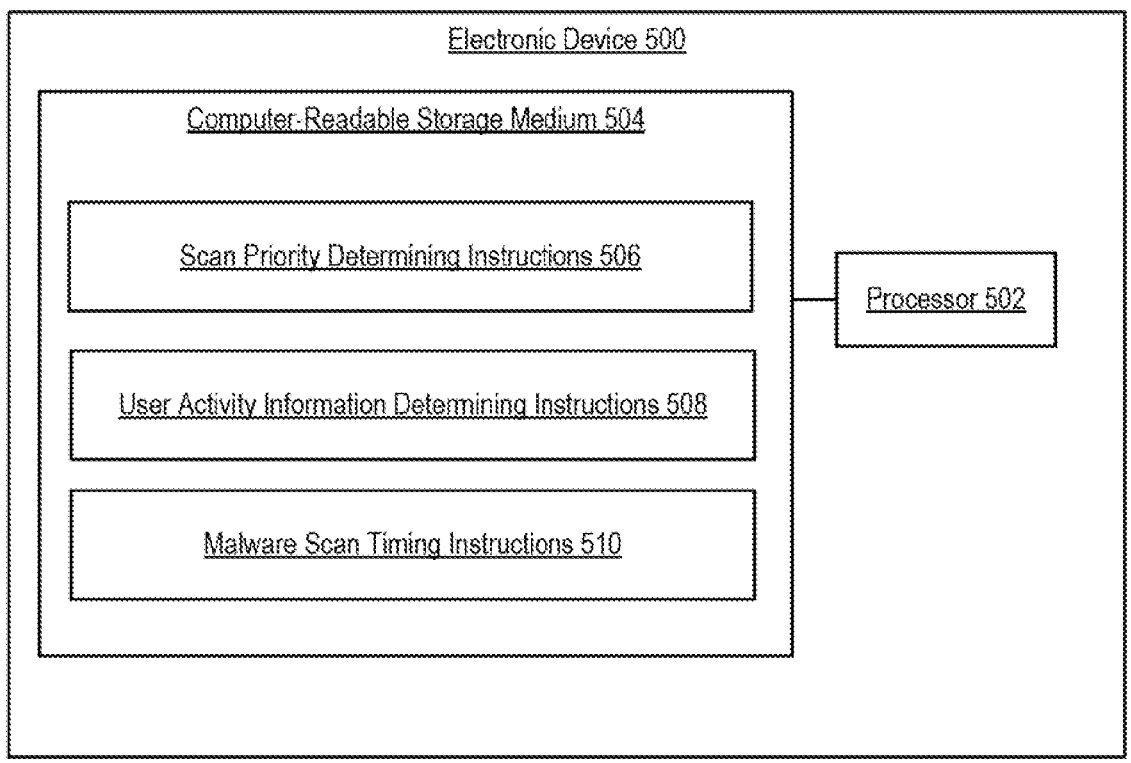
FIG. 5 illustrates an electronic device to scan for malware based on a scan priority of a file, according to another example.

FIG. 5 illustrates an electronic device 500 to scan for malware based on a scan priority of a file, according to another example. Electronic device 500 may include a processor 502 and a computer-readable storage medium 504. Processor 502 may be similar to processor 302 of FIG.

3. Computer-readable storage medium 504 may be similar to computer-readable storage medium 304 of FIG. 3. Computer-readable storage medium 504 may be encoded with instructions 506, 508, and 510.

Scan priority determining instructions 506 may determine a scan priority based on the combined risk score. For example, referring to FIG. 1, priority calculator 108 may determine a scan priority associated with file 122 based on a combined risk score, User activity information determining instructions 508 may determine user activity information. For example, referring to FIG. 1, user activity detector 116 may generate user activity information and provide the user activity information to malware scan queue 110 to determine a timing of malware scan. Malware scan timing instructions 510 may determine if a malware scan of a file is to be delayed based on the scan priority and the user activity information. For example, referring to FIG. 1, when the scan priority is the third priority (i.e., low risk), malware scan queue 110 may remove the file for scanning only when the user activity information indicates that the user is not actively interacting with electronic device 100; malware scan queue 110 may delay a malware scan of the file by keeping the file in malware scan queue 110 until the user activity information indicates that the user is no longer actively interacting with electronic device 100.

The use of "comprising", "including" or "having" are synonymous and variations thereof herein are meant to be inclusive or open-ended and do not exclude additional unrecited elements or method steps.

What is claimed is:

1. A non-transitory computer-readable storage medium comprising instructions that when executed cause a processor of an electronic device to:
   in response to detecting a malware scan trigger associated with a file, determine at least one of: a base risk score based on the source of the malware scan trigger, a metadata risk score based on metadata of the file, or a scan age risk score based on a previous scan of the file;
   determine at least one weight corresponding to the at least one of the base risk score, the metadata risk score, or the scan age risk score;
   determine a combined risk score associated with the file based on metadata of the file, a source of the malware scan trigger, and the at least one of the base risk score, the metadata risk score, or the scan age risk score, wherein the source includes a file access interceptor, a file write observer, and a file indexer;
   determine a scan priority based on the combined risk score; and
   perform a malware scan on the file based on the scan priority.

2. The non-transitory computer-readable storage medium of claim 1, wherein the scan priority includes a first scan priority, a second scan priority, and a third scan priority.

3. The non-transitory computer-readable storage medium of claim 1, wherein the instructions when executed further cause the processor to:
   determine the base risk score based on the source of the malware scan trigger;
   determine the metadata risk score based on the metadata;
   determine the scan age risk score based on a previous scan of the file; and
   determine the combined risk score based on the base risk score, the metadata risk score, and the scan age risk score.

4. The non-transitory computer-readable storage medium of claim 3, wherein the base risk score has a first weight of the at least one weight, the metadata risk score has a second weight of the at least one weight, and the scan age risk score has a third weight of the at least one weight.

5. The non-transitory computer-readable storage medium of claim 1, wherein the metadata includes a first type of metadata and a second type of metadata, wherein the instructions when executed further cause the processor to:
   determine an access risk score based on an entity that attempts to access the file;
   determine a first metadata risk score based on the first type of metadata; and
   determine a second metadata risk score based on the second type of metadata,
   wherein the combined risk score is further based on the access risk score, the first metadata risk score, the second metadata risk score, or a combination thereof.

6. The non-transitory computer-readable storage medium of claim 5, wherein the first metadata risk score is determined based on acquisition information of the file, and wherein the second metadata risk score is determined based on a security parameter of the file.

7. A non-transitory computer-readable storage medium comprising instructions that when executed cause a processor of an electronic device to:
   in response to detecting a malware scan trigger associated with a file having metadata including a first type of metadata and a second type of metadata, determine a first metadata risk score based on the first type of metadata and a second metadata risk score based on the second type of metadata, wherein the first metadata risk score is determined based on acquisition information of the file, and wherein the second metadata risk score is determined based on a security parameter of the file;
   determine a combined risk score based on the first metadata risk score and the second metadata risk score;
   determine a scan priority associated with the file based on the combined risk score and the metadata of the file;
   determine a scan depth and a number of scans based on the scan priority; and
   perform a set of malware scans on the file based on the scan depth and the number of scans.

8. The non-transitory computer-readable storage medium of claim 7, wherein the instructions when executed cause the processor to:
   when the scan priority is a first scan priority:
   perform a first malware scan on the file having a first scan depth; and
   perform a second malware scan on the file having a second scan depth, wherein the second scan depth is higher than the first scan depth, and wherein the second malware scan is subsequent to the first malware scan; and
   when the scan priority is a second scan priority that is lower than the first scan priority, perform a malware scan on the file having the second scan depth.

9. The non-transitory computer-readable storage medium of claim 7, wherein the first type of metadata includes an application that generated or received the file, and wherein the second type of metadata includes digital signature information embedded in the file.

10. A non-transitory computer-readable storage medium comprising instructions that when executed cause a processor of an electronic device to:
    detect a malware scan trigger associated with a file;
    determine a base risk score based on the source of the malware scan trigger;
    determine a metadata risk score based on the metadata;

determine a scan age risk score based on a previous scan of the file;

determine a combined risk score based on the base risk score, the metadata risk score, and the scan age risk score;

determine a scan priority associated with the file based on the combined risk score;

determine user activity information, wherein the user activity information indicates when a user is actively interacting with the electronic device; and determine a delay of a malware scan of the file based on the scan priority and the user activity information.

11. The non-transitory computer-readable storage medium of claim 10, wherein the user activity information includes power source information that indicates whether the electronic device is powered by a battery or an alternate current (AC) adapter.

12. The non-transitory computer-readable storage medium of claim 10, wherein the user activity information includes a window size displaying content of a foreground application.

13. The non-transitory computer-readable storage medium of claim 10, wherein the user activity information includes a status of a lock screen.

14. The non-transitory computer-readable storage medium of claim 10, wherein the user activity information includes a status of an input device of the electronic device.

15. The non-transitory computer-readable storage medium of claim 10, wherein the instructions when executed further cause the processor to:

when the scan priority is a first scan priority, perform the malware scan without delay; and when the scan priority is not the first scan priority and the user activity information indicates that the user is actively interacting with the electronic device, delay the malware scan until the user activity information indicates that the user is no longer actively interacting with the electronic device.

16. The non-transitory computer-readable storage medium of claim 10, wherein the base risk score has a first weight, the metadata risk score has a second weight, and the scan age risk score has a third weight, and wherein the combined risk score if further based on the first weight, the second weight, and the third weight.

17. The non-transitory computer-readable storage medium of claim 7, wherein the instructions when executed further cause the processor to:

determine an access risk score based on an entity that attempts to access the file;

determine a base risk score based on the source of the malware scan trigger;

determine a scan age risk score based on a previous scan of the file;

wherein the combined risk score is further based on the access risk score, the base risk score, and the scan age risk score.

* * * * *